No. 776,170. PATENTED NOV. 29, 1904.
F. P. BURKHARDT.
BELT TIGHTENER.
APPLICATION FILED MAY 29, 1903.
NO MODEL.
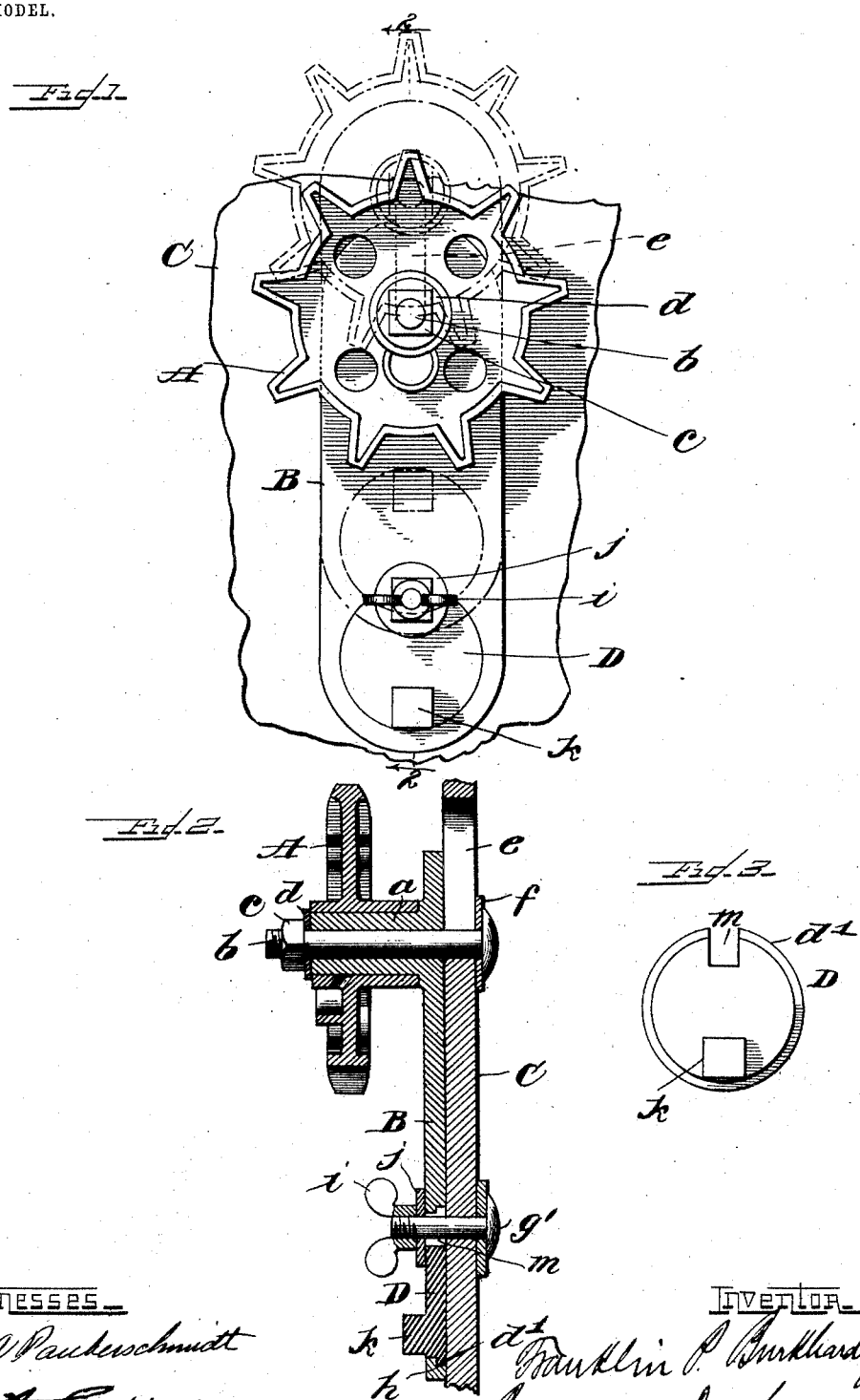

No. 776,170. Patented November 29, 1904.

UNITED STATES PATENT OFFICE.

FRANKLIN P. BURKHARDT, OF CHICAGO, ILLINOIS.

BELT-TIGHTENER.

SPECIFICATION forming part of Letters Patent No. 776,170, dated November 29, 1904.

Application filed May 29, 1903. Serial No. 159,226. (No model.)

*To all whom it may concern:*

Be it known that I, FRANKLIN P. BURKHARDT, a citizen of the United States, residing at Chicago, in the county of Cook and State of Illinois, have invented a new and useful Improvement in Belt-Tighteners, of which the following is a specification.

This invention relates to improvements in belt-tighteners.

The object of the invention is to form a tightener which can be readily adjusted by means of the ordinary tools carried with the machine and to form a simple practical device that does not occupy an objectionable amount of space at the point at which the same is attached and which may be cheaply built and easily assembled.

The invention consists, substantially, in the construction set forth in the accompanying specification, and more particularly pointed out in the claims.

Like letters refer to the same parts in the several figures of the drawings, in which—

Figure 1 is a plan view of the belt-tightener with the part of the machine to which it is applied broken away. Fig. 2 is a longitudinal section of the same on the line 2 2, Fig. 1. Fig. 3 is a plan view of an eccentric used in the belt-tightener.

This invention is more particularly applicable to arrangements of mechanism where the chain or belt is driven from a fixed shaft at one end and at the other end is supported on an idle sprocket or pulley, which can be moved away from the fixed one—such, for instance, as in corn-harvesters and similar machines where the chains are long—and any intermediate tightener which takes up the slack by throwing a bend into the chain consumes the power of the machine, all of which is needed, and in which class of machines it is desirable that the adjustment of the chain shall not materially change its path of travel, and thereby interference with adjoining mechanism will be prevented.

In the drawings, A designates a sprocket-wheel, which may be termed an "idler" and which is designed to be adjusted, by means of the belt-tightener, so as to tighten such belt. B designates a plate or support on a projection $a$, of which the sprocket A is mounted or journaled and which is secured to the frame C. In the frame C opposite the upper end of this plate is provided an elongated slot $e$, and a bolt $b$ passes through the hub of the plate, the plate itself, and the vertical slot in the frame, and its head preferably bears upon a washer $f$ on the inside of the frame. If a metal frame is used, the washer is not so necessary; but with a wooden frame it is particularly desirable. The outer end of this bolt $b$ is screw-threaded to receive thereon a nut $c$, and interposed between the nut $c$ and the end surfaces of hub $a$ and the hub of the sprocket-wheel A is a retaining-washer $d$. Near the lower end of this plate B there is formed a circular aperture, which is rabbeted on the under side as a matter of convenience, although, of course, this is a detail not essential to the principle of the invention. A fixed bolt $g'$ has its head bear upon a washer on the inside of the frame and passes through an aperture in said washer and frame and also through the circular aperture in the plate and through a hole in an eccentric D, which eccentric has its head rabbeted oppositely from the rabbet in the plate, so that it may be applied from the under side and its flange bear against the flange in the plate and confine it in the circular aperture therein while permitting free rotation. A washer $j$ may be interposed between the plate and the nut $i$, which is shown as a wing or hand nut. This nut engages the outer threaded end of the bolt $g'$ and serves to secure the plate and frame together and act as a pivot upon which the eccentric D may turn. The flanged edge of this eccentric is marked $d'$, and a handle for manipulating the same (marked $k$) is provided, which preferably is of the form shown to adapt it to a wrench. Furthermore, this handle is arranged diametrically opposite an aperture $m$ cut in the eccentric D and through which the bolt $g'$ extends, so as to give the greatest possible throw and the greatest amount of leverage.

The operation of the device above described is as follows: In the position shown in full lines in the drawings the sprocket-wheel has not been adjusted and the belt or chain not tightened; but when it is desired to tighten the belt or chain the operator may with a wrench, such as is usually carried on the machine, loosen the nut c and the nut i (which latter is also provided with means for receiving a wrench as well as with the wing projections) and may then turn or rotate the eccentric disk D about bolt g' as a pivot by applying the wrench to the lug or handle k on the eccentric disk D, which being eccentrically mounted on the bolt g' and operating in the seat formed in plate B to receive the same causes said eccentric disk D to act as a disk cam to move or adjust the position of the plate B relative to the frame C, and consequently of the sprocket A, carried by said plate, and thereby put greater tension on the belt or chain. It is obvious that when the parts are adjusted if too much tension is found to be placed on the belt or chain it may be relieved by a reverse operation of the eccentric. When the desired adjustment of the sprocket is secured, the operator may hold the eccentric in place with the wrench and with his other hand manipulate the winged nut until it bears so firmly, through the medium of the washer, on the plate that all danger of slipping of the sprocket is removed. The wrench may then be removed from the eccentric disk and the nuts i and d tightened as firmly as may be desired, which will thus effectually lock the sprocket against movement with respect to the support C.

It is manifest that many variations may be made in the details of the device described and shown without departing from the principle of the invention and that many applications of this belt-tightener may be made other than that particularly suggested herein.

What I claim, and desire to secure by Letters Patent, is—

1. In a belt-tightener, the combination with a frame, of a plate adjustably mounted thereon, a sprocket-wheel journaled upon said plate, and an eccentric pivotally mounted upon the frame and arranged to engage said plate to adjust the same upon said frame.

2. The combination with a frame, of a plate mounted thereon for adjustment relative thereto, a sprocket-wheel journaled on said plate, a bearing formed in said plate, and an eccentric pivotally mounted upon the frame and operating in said bearing to adjust the position of said plate.

3. In a belt-tightener, a frame having an elongated slot, a plate mounted upon said frame and carrying a stud or bolt arranged to extend through said slot, a sprocket-wheel supported upon said stud in fixed relation with respect to said plate, a bolt rigidly mounted upon said frame, and an eccentric pivotally mounted upon said last-mentioned bolt and arranged to engage said plate to adjust the same.

4. In a belt-tightener, the combination with an adjustable wheel and a frame, of an eccentric-adjusting device pivoted to the frame and independent of the wheel and arranged to adjust said wheel; substantially as and for the purpose set forth.

5. In a belt-tightener, the combination with a wheel having a movable support, a frame having an approximately straight and elongated slot for guiding said support, and an eccentric-adjusting device pivotally supported independent of the wheel-support and arranged to engage said wheel-support to adjust said wheel; substantially as and for the purpose set forth.

6. In a belt-tightener, the combination with a frame having an elongated approximately straight slot, a wheel having a support connected thereto which is guided in said slot, of an eccentric disk, a bolt rigidly mounted in said frame and upon which said disk is pivoted, said disk arranged to engage the wheel-support to adjust the same; substantially as and for the purpose set forth.

7. In a belt-tightener, the combination with a frame having an elongated approximately straight slot, a plate resting against the frame and having a projecting hub rigid therewith, a wheel journaled on such hub, a support passing through the hub and through the slot, and an eccentric-adjusting device pivotally mounted upon said frame independently of said hub and support and arranged to engage said plate, whereby the wheel may be adjusted in right lines; substantially as and for the purpose set forth.

8. In a belt-tightener, the combination with a frame having an elongated approximately straight slot, a plate bearing on such frame and having a projecting hub integral therewith, a wheel journaled on such hub, and a shaft or support passing through the hub and slot, of an eccentric disk also secured to the frame but independently of said hub and support and connected to operate the plate and thereby adjust the position of the wheel; substantially as and for the purpose set forth.

9. In a belt-tightener, the combination with a frame having an elongated approximately straight slot, a plate, a wheel, an eccentric device, said plate having a bearing for said wheel and an independent bearing for said eccentric device mounted thereon; substantially as and for the purpose set forth.

10. In a belt-tightener, the combination with a frame having an elongated approximately straight slot, a plate having a bearing-seat near the lower end thereof, a wheel journaled on the plate near its upper end, a shaft or support passing through the plate and through the slot in the frame, an eccentric device bearing in the seat in said plate, and a pivot-bolt connecting such eccentric device to the frame; substantially as and for the purpose set forth.

11. In a belt-tightener, the combination with a frame, a wheel, a plate supported on the frame and furnishing a bearing for the wheel and having a seat formed therein independent of the wheel-bearing, of an eccentric device arranged in said seat and pivoted to the frame; substantially as and for the purpose set forth.

12. In a belt-tightener, the combination with a frame, of a plate adjustably mounted on said frame and provided with a bearing, of a wheel journaled on such bearing, a clamping-bolt securing the plate and frame and adjustable with the plate in said frame, an actuating device, for moving the plate, pivoted to the frame independently of the wheel-bearing and clamping-bolt, and a locking mechanism for maintaining the actuating device in any given position; substantially as and for the purpose set forth.

13. In a belt-tightener, the combination with a frame having an elongated slot, a plate having a bearing, a wheel journaled on such bearing, a bolt passing through said bearing and through the slot in the frame, and a nut for clamping these parts in position, of an actuating device for moving the plate and thereby adjusting the position of the wheel, a bolt for pivotally securing the actuating device to the frame independently of the wheel-bearing and its clamping-bolt, and a combined winged and wrench nut engaging the bolt; substantially as and for the purpose set forth.

14. In a belt-tightener, the combination with a frame and an adjustable wheel, of an eccentric device having a handle for moving the same and adapted itself to move the wheel in its relation to the frame, a bolt passing through the eccentric device and frame and serving as a pivot for such device, and a nut engaging the end of said bolt and provided with winged projections and a wrench-hold; substantially as and for the purpose set forth.

15. In a belt-tightener, the combination with a frame and a wheel adjustable in said frame, of an eccentric disk provided with a wrench handle or lug and a pivot passing through the same and the frame, and a locking-nut provided with wings and a wrench-hold; substantially as and for the purpose set forth.

16. In a belt-tightener, the combination with a frame, a plate adjustable with reference to such frame and having a bearing for a wheel and having a rabbeted recess, of an eccentric disk having a rabbeted edge adapted to fit the rabbeted recess in the plate, and means for securing such eccentric in any position to which it may be put; substantially as and for the purpose set forth.

17. In a belt-tightener, the combination with a frame of a machine having an elongated approximately straight slot formed therein and an aperture at a little distance therefrom, of a plate having its face bearing against the frame and having a projecting stud or hub serving as a bearing, a wheel mounted upon such bearing, a bolt passing through the bearing and elongated slot in the frame and bearing against the reverse thereof by means of its head, a nut engaging threads on the bolt at the other end thereof and serving to clamp the plate to the frame when adjusted, said plate also having a circular recess rabbeted from the under side, an eccentric disk provided with a lug or handle and a slot at its opposite periphery and having a rabbeted edge fitting the rabbeted edge of the plate, a bolt passing through such disk and having its head bear against the reverse side of the frame, a clamping-nut having wings and wrench-hold and bearing against a washer, which in turn bears against the disk and the plate and secures them in fixed relation; substantially as and for the purpose set forth.

In witness whereof I have hereunto set my hand, this 26th day of May, 1903, in the presence of the subscribing witnesses.

FRANKLIN P. BURKHARDT.

Witnesses:
   A. L. SPRINKLE,
   E. H. KIMBARK.